(12) United States Patent
Chen

(10) Patent No.: US 6,820,998 B2
(45) Date of Patent: Nov. 23, 2004

(54) ENERGY SAVING TYPE OF LIGHT EMITTING DIODE LAMP

(75) Inventor: Hsing Chen, Ju-Bei (TW)

(73) Assignee: Solidlite Corporation, Ju-Bei (TW)

( * ) Notice: Subject to any disclaimer, the term of this patent is extended or adjusted under 35 U.S.C. 154(b) by 0 days.

(21) Appl. No.: 10/192,517

(22) Filed: Jul. 9, 2002

(65) Prior Publication Data

US 2003/0117803 A1 Jun. 26, 2003

(30) Foreign Application Priority Data

Dec. 25, 2001 (TW) ........................................ 90132472 A

(51) Int. Cl.⁷ .............................................. F21V 21/29
(52) U.S. Cl. ........................ 362/276; 362/249; 362/276; 362/802
(58) Field of Search ................................. 362/276, 802, 362/249, 184, 185, 251, 250, 254, 800, 95, 394; 315/74, 75, 56, 57, 70, 149–159

(56) References Cited

U.S. PATENT DOCUMENTS

| 5,626,417 A | * | 5/1997 | McCavit ..................... 362/276 |
| 5,649,761 A | * | 7/1997 | Sandell et al. ............. 362/276 |
| 5,867,099 A | * | 2/1999 | Keeter ....................... 340/567 |
| 6,140,934 A | * | 10/2000 | Lam ......................... 340/815.4 |
| 6,168,282 B1 | * | 1/2001 | Chien ......................... 362/84 |
| 6,175,196 B1 | * | 1/2001 | Ragner et al. ........... 315/200 A |
| 6,294,873 B1 | * | 9/2001 | Yu ............................. 315/149 |
| 6,309,090 B1 | * | 10/2001 | Tukin ........................ 362/276 |
| 6,402,339 B1 | * | 6/2002 | Mukogawa et al. ........ 362/184 |
| 6,462,475 B1 | * | 10/2002 | Lee ............................. 315/57 |
| 6,509,323 B1 | * | 1/2003 | Davis et al. ................ 514/58 |
| 6,523,978 B1 | * | 2/2003 | Huang ....................... 362/252 |
| 6,547,417 B2 | * | 4/2003 | Lee ............................. 362/249 |

* cited by examiner

Primary Examiner—Sandra O'Shea
Assistant Examiner—John Anthony Ward
(74) Attorney, Agent, or Firm—Pro-Techtor International Services

(57) ABSTRACT

An energy saving type of light emitting diode lamp is disclosed. In such a manner, the human body sensor may be used to detect existence of the human body. Thus, the LED lamp is disposed at a low illuminance state normally, and may be converted into a high illuminance state when the human body approaches. In addition, the light sensor may be used to detect the environmental illuminance. Thus, when the environmental illuminance is insufficient, the light source is fully opened or half opened, and when the environmental illuminance is sufficient, the light source is closed. In such a manner, the LED lamp may be operated by a high power with a large current during a short time, so that the LED lamp consumes less electricity, has a long lifetime, and saves energy highly.

7 Claims, 2 Drawing Sheets

ENERGY SAVING TYPE OF LIGHT EMITTING DIODE LAMP

BACKGROUND OF THE INVENTION

1. Field of the Invention

The present invention relates to an energy saving type of light emitting diode lamp, and more particularly to an energy saving type of light emitting diode lamp that consumes less electricity, has a long lifetime, and saves energy highly.

2. Description of the Related Art

A conventional lamp is available for serving as the light source of the road lamp, the passageway lamp, the ladder lamp, the garden lamp, the lamp of the parking site or the like. The conventional lamp usually maintains constant illuminance and brightness that cannot be adjusted according to the environmental requirement. Thus, the conventional lamp is normally operated successively during a long-term by supply of the full electric power, thereby causing energy consumption and thereby increasing the cost. In addition, the conventional lamp has a shorter lifetime due to successive use.

SUMMARY OF THE INVENTION

The present invention has arisen to mitigate and/or obviate the disadvantage of the conventional lamp.

The primary objective of the present invention is to provide an energy saving type of light emitting diode lamp, wherein the human body sensor may be used to detect existence of the human body. Thus, the LED lamp is disposed at a low illuminance state normally, and may be converted into a high illuminance state when the human body approaches.

Another objective of the present invention is to provide an energy saving type of light emitting diode lamp, wherein the light sensor may be used to detect the environmental illuminance. Thus, when the environmental illuminance is insufficient, the light source is fully opened or half opened, and when the environmental illuminance is sufficient, the light source is closed.

A further objective of the present invention is to provide an energy saving type of light emitting diode lamp, wherein the LED lamp may be operated by a high power with a large current during a short time, so that the LED lamp consumes less electricity, has a long lifetime, and saves energy highly.

A further objective of the present invention is to provide an energy saving type of light emitting diode lamp, wherein the control circuit may be used to adjust the output voltage, current and time of the energy saving type of light emitting diode lamp according to the values of the input signal.

A further objective of the present invention is to provide an energy saving type of light emitting diode lamp, wherein the bulb copper head is a bulb copper head the same as a commonly used illumination filament type bulb, so that the bulb copper head may be mounted on the commonly used socket without having to additionally provide any transformer, thereby enhancing the compatibility and convenience of use.

In accordance with one aspect of the present invention, there is provided an energy saving type of light emitting diode lamp, comprising a human body sensor, multiple light emitting diode members, a light sensor, a control circuit, a time regulating switch, a lamp face plate, a lamp housing, and a bulb copper head, wherein:

the lamp face plate is mounted on the lamp housing, the human body sensor and the multiple light emitting diode members are placed in the lamp face plate, the light sensor is mounted on one side of the lamp face plate, the control circuit having the time regulating switch is placed in the lamp housing, the electric power terminal of the lamp housing is the bulb copper head, and the bulb copper head may be mounted on a socket of a conventional illumination filament type bulb.

Preferably, the human body sensor is used to detect existence of the human body, so that when no one passes the energy saving type of light emitting diode lamp, the energy saving type of light emitting diode lamp uses a relatively lower power with relatively smaller brightness, and when the human body passes the energy saving type of light emitting diode lamp, the energy saving type of light emitting diode lamp uses a relatively higher power with relatively greater brightness.

Preferably, the light sensor may be an optical sensitive resistor, a light receiving diode, or a light receiving transistor, having a function of detecting illuminance of the light, so that when an environmental illuminance is insufficient, the energy saving type of light emitting diode lamp is turned on by the light sensor, and may be adjusted to a required illuminance automatically according to the environmental illuminance, so that the energy saving type of light emitting diode lamp may be maintained at a determined illuminance.

Preferably, the light emitting diode member may be replaced by any light emitting member.

Preferably, the energy saving type of light emitting diode lamp may be provided with one human body sensor and one light sensor or multiple human body sensors and multiple light sensors according to an environmental requirement.

Preferably, the human body sensor may be a supersonic wave sensor, a focus electrical type infrared sensor, or an infrared LED reflective type sensor.

Further benefits and advantages of the present invention will become apparent after a careful reading of the detailed description with appropriate reference to the accompanying drawings.

DETAILED DESCRIPTION OF THE INVENTION

Figure 1:
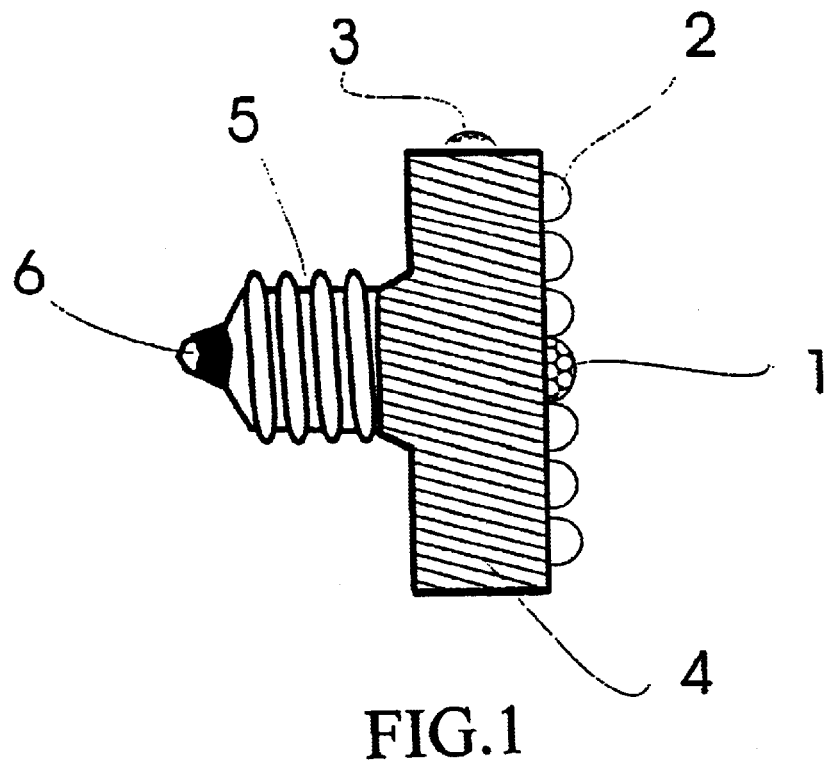
FIG. 1 is a side plan cross-sectional view of an energy saving type of light emitting diode lamp in accordance with a preferred embodiment of the present invention.
Figure 2:
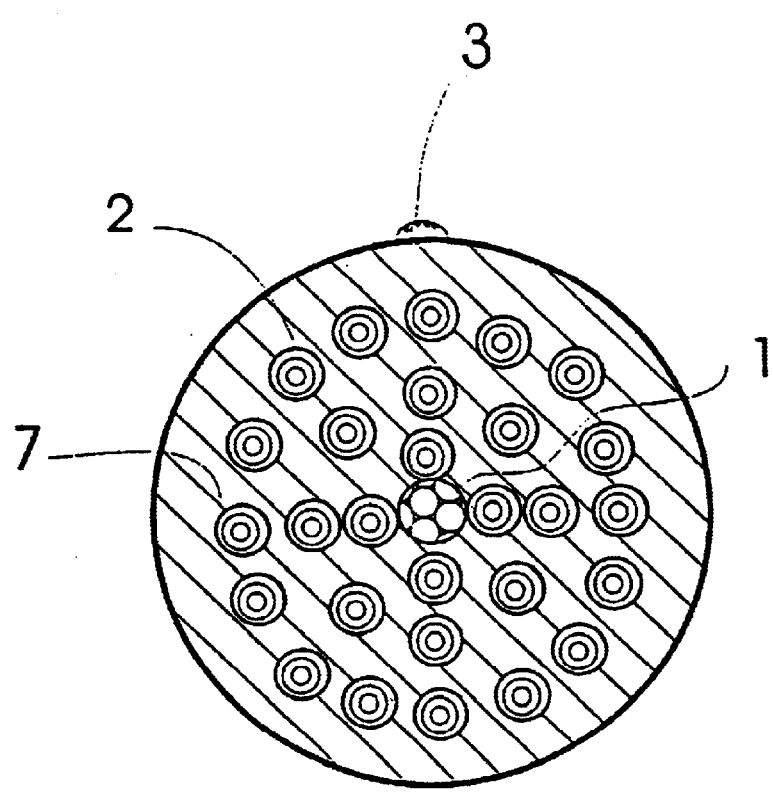
FIG. 2 is a front plan view of the energy saving type of light emitting diode lamp in accordance with the preferred embodiment of the present invention.
Figure 3:
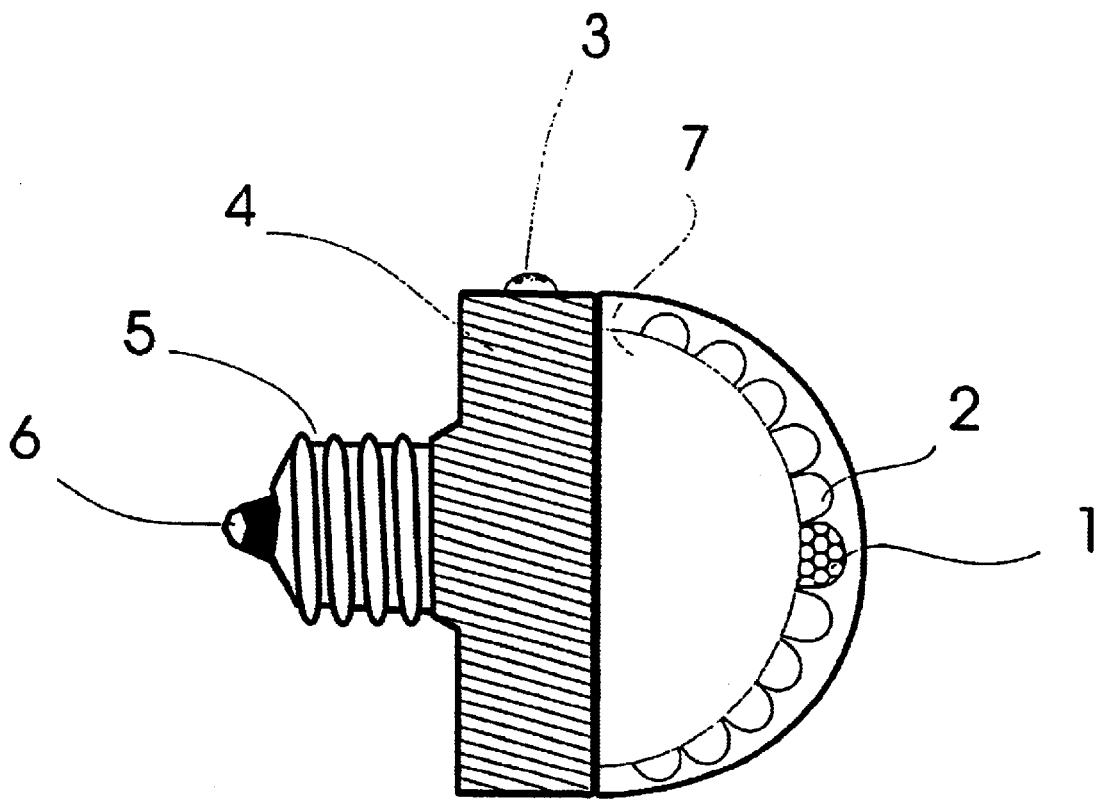
FIG. 3 is a side plan cross-sectional view of an energy saving type of light emitting diode lamp in accordance with a preferred embodiment of the present invention.
Figure 4:
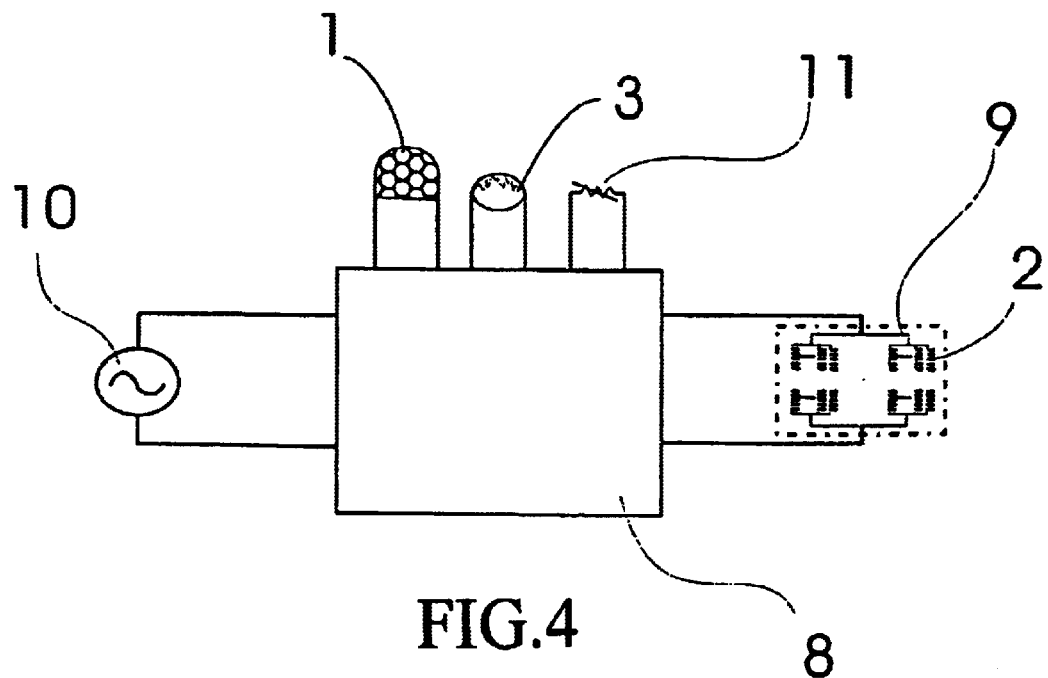
FIG. 4 is a schematic diagram of a control circuit of the energy saving type of light emitting diode lamp in accordance with the preferred embodiment of the present invention.

Referring to the drawings and initially to FIGS. 1–3, an energy saving type of light emitting diode lamp in accordance with a preferred embodiment of the present invention comprises a human body sensor 1, a light emitting diode member 2, a light sensor 3, a lamp face plate 7, a control circuit 8 (see FIG. 4), a time regulating switch 11, a lamp housing 4, and a bulb copper head 5.

The human body sensor 1 is used to detect existence of the human body. The human body sensor 1 may be a focus electrical type infrared sensor, an infrared LED reflective type sensor, a supersonic wave sensor or the like, for adjustment of output of the circuit signal.

The light emitting diode member 2 is an excellent illumination member, with the features of environmental protection, safety, long lifetime, and energy saving.

The light sensor 3 may be used to detect the strength of illuminance of the light. The light sensor 3 may be an photo sensitive resistor, a light receiving diode, a light receiving transistor or the like, for adjustment of output signal switch of the circuit.

The control circuit 8 may be used to adjust the output voltage, current and time of the lamp according to the values of the signal.

The time regulating switch 11 may be an adjustable switch, a variable resistor, or a variable capacitor, for manually adjusting the time of successive operation of the lamp.

The bulb copper head 5 is a bulb copper head the same as the conventional illumination filament type bulb.

Thus, the above-mentioned members may construct the energy saving type of light emitting diode lamp in accordance with a preferred embodiment of the present invention.

The lamp face plate 7 is mounted on the lamp housing 4, and the human body sensor 1 and multiple light emitting diode members 2 are placed in the lamp face plate 7. The light sensor 3 is mounted on one side of the lamp face plate 7. Then, the control circuit 8 having the time regulating switch 11 is placed in the lamp housing 4. The electric power terminal of the lamp housing 4 is the bulb copper head 5. In addition, the bulb copper head 5 may be mounted on the socket of the conventional illumination filament type bulb.

In the present invention, the human body sensor 1 may adopt two infrared sensors including the focus electrical type infrared sensor and the infrared LED reflective type sensor. The supersonic wave sensor may also be used, but the infrared LED reflective type sensor and the supersonic wave sensor have to mate with each other for use, wherein one is used for the emitting function and the other is used for the receiving function, so that the reflection effect may control the signal when the human body approaches.

Accordingly, the energy saving type of light emitting diode lamp in accordance with the preferred embodiment of the present invention has the following advantages.

When no one passes the energy saving type of light emitting diode lamp at the dark night, the energy saving type of light emitting diode lamp is disposed at a slightly bright state, wherein the illuminance is half of the total illuminance. When someone passes the energy saving type of light emitting diode lamp at the dark night, the energy saving type of light emitting diode lamp is disposed at a fully bright state. After the person passes the energy saving type of light emitting diode lamp at the dark night, the energy saving type of light emitting diode lamp will be automatically turned into a slightly bright state during about a few minutes, wherein the illuminance is half of the total illuminance. In addition, the energy saving type of light emitting diode lamp will distinguish automatically at the day time. Further, the energy saving type of light emitting diode lamp of the present invention employs the white light LED to function as the light emitting members, so that the current may be adjusted arbitrarily, so as to control the brightness.

In such a manner, the human body sensor 1 may be used to detect existence of the human body. Thus, the LED lamp is disposed at a low illuminance state normally, and may be converted into a high illuminance state when the human body approaches. In addition, the light sensor 3 may be used to detect the environmental illuminance. Thus, when the environmental illuminance is insufficient, the light source is fully opened or half opened, and when the environmental illuminance is sufficient, the light source is closed. In such a manner, the LED lamp may be operated by a high power with a large current during a short time, so that the LED lamp consumes less electricity, has a long lifetime, and saves energy highly.

Thus, the energy saving type of light emitting diode lamp of the present invention is available for serving as the illumination light source of the road lamp, the passageway lamp, the ladder lamp, the garden lamp, the lamp of the parking site or the like, thereby saving energy and cost of the electrical power. In addition, the energy saving type of light emitting diode lamp of the present invention may efficiently satisfy the requirements of environmental protection, safety, long lifetime, and energy saving.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An energy saving type of light emitting diode lamp, comprising:
   a human body sensor,
   multiple light emitting diode members,
   a light sensor,
   a control circuit,
   a time regulating switch,
   a lamp face plate,
   a lamp housing, and
   a bulb copper head, wherein;
      the lamp face plate is mounted on the lamp housing,
      the human body sensor and the multiple light emitting diode members are placed in the lamp face plate,
      the light sensor is mounted on one side of the lamp face plate,
      the control circuit including the time regulating switch is placed in the lamp housing,
      the electric power terminal of the lamp housing is the bulb, copper head, and
      the bulb copper head is mounted on a socket of a conventional illumination filament type bulb; and wherein
      the human body sensor is used to detect existence of the human body, so that when no one has passed the lamp for a predefined period of time, the lamp uses a low power with brightness that is less than half of full brightness, and when a human body triggers the human body sensor, the lamp uses a high power with full brightness.

2. The energy saving type of light emitting diode lamp in accordance with claim 1, wherein the light sensor is a photo sensitive resistor, a light receiving diode, or a light receiving transistor, the light sensor detecting illuminance of the light, so that when an environmental illuminance is insufficient, the lamp is turned on by the light sensor, and is adjusted to a required illuminance automatically according to the environmental illuminance.

3. The energy saving type of light emitting diode lamp in accordance with claim 1, wherein the light emitting diode member is replaced by any light emitting member.

4. The energy saving type of light emitting diode lamp in accordance with claim 1, wherein the control circuit is used to adjust the output voltage, current and time of the lamp according to the values of an input signal.

5. The energy saving type of light emitting diode lamp in accordance with claim 1, wherein the bulb copper head is an illumination filament type bulb.

6. The energy saving type of light emitting diode lamp in accordance with claim 1, wherein the energy saving type of light emitting diode lamp is provided with one human body sensor and one light sensor or multiple human body sensors and multiple light sensors according to an environmental requirement.

7. The energy saving type of light emitting diode lamp in accordance with claim 1, wherein the human body sensor is a supersonic wave sensor, a focus electrical type infrared sensor, or an infrared LED reflective type sensor.

* * * * *